United States Patent
Xu et al.

(10) Patent No.: US 9,325,395 B1
(45) Date of Patent: Apr. 26, 2016

(54) CHANNEL PROCESSING WITH DEDICATED PILOTS UTILIZING INFORMATION FROM BROADCAST PILOTS

(71) Applicant: MARVELL INTERNATIONAL LTD., Hamilton (BM)

(72) Inventors: Mingguang Xu, Sunnyvale, CA (US); Yakun Sun, Sunnyvale, CA (US); Christian R. Berger, San Jose, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/042,788

(22) Filed: Oct. 1, 2013

Related U.S. Application Data

(60) Provisional application No. 61/708,879, filed on Oct. 2, 2012.

(51) Int. Cl.
| | | |
|---|---|---|
| *H04B 7/04* | (2006.01) | |
| *H04L 25/03* | (2006.01) | |
| *H04L 25/06* | (2006.01) | |
| *H04L 1/06* | (2006.01) | |
| *H04L 1/20* | (2006.01) | |

(52) U.S. Cl.
CPC ........ *H04B 7/0421* (2013.01); *H04L 25/03038* (2013.01); *H04L 25/067* (2013.01); *H04L 1/0618* (2013.01); *H04L 1/20* (2013.01)

(58) Field of Classification Search
CPC ........ H04L 1/0618; H04L 1/20; H04L 7/0008
See application file for complete search history.

(56) References Cited

U.S. PATENT DOCUMENTS

| | | |
|---|---|---|
| 8,238,483 B2 | 8/2012 | Erell et al. |
| 2007/0110172 A1* | 5/2007 | Faulkner et al. ............... 375/260 |
| 2010/0220800 A1* | 9/2010 | Erell et al. ..................... 375/267 |
| 2012/0106614 A1* | 5/2012 | Kim et al. ...................... 375/227 |
| 2014/0135025 A1* | 5/2014 | Yoo et al. .................... 455/452.1 |

\* cited by examiner

*Primary Examiner* — Leon-Viet Nguyen

(57) ABSTRACT

Systems, methods, and other embodiments associated with channel processing with dedicated pilots utilizing information from broadcast pilots are described. According to one embodiment, an method includes receiving, through a channel, i) a signal resource block that includes data and a dedicated pilot that is precoded and ii) at least one broadcast pilot that is not precoded. A channel property is deduced from the broadcast pilot; and the channel is processed by applying the channel property to the dedicated pilot. In one embodiment, the method includes estimating an effective channel by applying the channel property to the dedicated pilot.

13 Claims, 4 Drawing Sheets

CHANNEL PROCESSING WITH DEDICATED PILOTS UTILIZING INFORMATION FROM BROADCAST PILOTS

CROSS REFERENCE TO RELATED APPLICATIONS

This patent disclosure claims the benefit of U.S. provisional application Ser. No. 61/708,879 filed on Oct. 2, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Some communication systems transmit data from a transmitter to a receiver over multiple communication channels, using multiple transmit antennas and multiple receive antennas. Multiple channel transmission is used, for example, in spatial multiplexing schemes that achieve high throughput, in beam-forming schemes that achieve high antenna directivity, and in spatial diversity schemes that achieve high resilience against channel fading and multipath effects. These schemes are often referred to collectively as Multiple-Input Multiple-Output (MIMO) schemes.

In some MIMO schemes, a transmitter maps streams of modulated symbols onto spatial layers. The spatial layers are signals that are to be transmitted to a receiver over different MIMO transmission channels. The transmitter then applies a precoding operation to map each spatial layer onto a respective set of transmit antenna ports. The transmitter allocates a set of time-frequency blocks, referred to as resource blocks (RB), for transmission to a certain receiver. The signals within each resource block or multiple resource blocks are precoded using a respective precoding scheme, which specifies a mapping of spatial layers onto transmit antenna ports. Each resource block includes one or more dedicated (also called UE-specific) pilot signals, also known as dedicated reference signals (DRSs) which are precoded using the precoding scheme associated with the resource block. The resource block also includes one or more broadcast pilot signals, also known as cell-specific reference signals (CRSs), that are not precoded. In general, CRSs are transmitted in wideband (e.g., across the whole band which may be wider than the band allocated to a specific receiver) and intended for all the receivers within a cell. In general, DRSs are intended for a specific receiver and are transmitted only on the allocated resource blocks for the intended receiver.

SUMMARY

In general, in one aspect this specification discloses an apparatus for performing channel processing with dedicated pilots utilizing information from broadcast pilots. The apparatus includes a logic and a receiver configured to receive, through a channel, i) a signal resource block that includes data and a dedicated pilot that are precoded for reception by the receiver and ii) at least one broadcast pilot that is not precoded for reception by the receiver. The logic is configured to perform channel processing by deducing a channel property from the broadcast pilot and applying the deduced channel property when processing the dedicated pilot.

In general, in another aspect, this specification discloses a method for performing channel processing with dedicated pilots utilizing information from broadcast pilots. The method includes receiving, through a channel, i) a signal resource block that includes data and a dedicated pilot that is precoded and ii) at least one broadcast pilot that is not precoded. A channel property is deduced from the broadcast pilot and the channel is processed by applying the channel property to the dedicated pilot.

In general, in another aspect, this specification discloses an integrated circuit device that includes a receiver and a plurality of antennas configured to receive ii) a signal resource block that includes data and a dedicated pilot that is precoded for reception by the receiver and ii) at least one broadcast pilot that is not precoded. The integrated circuit device also includes a pilot processing component configured to estimate an effective channel for the signal resource block by deducing a channel property of the effective channel based, at least in part, on the at least one broadcast pilot; and estimating the effective channel based, at least in part, on the channel property and the dedicated pilot.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

In a MIMO system, the receiver typically processes the channel parameters by processing the dedicated pilot signals (hereinafter dedicated pilots) in the received resource block. Since each resource block is precoded with a precoding scheme that may change from one block to another, the effective channel parameters for data transmission often vary from block to block in a way that is unknown to the receiver a-priori. Therefore the typical receiver is limited to estimating the channel using only the dedicated pilots within a single block, which limits the achievable accuracy because of the limited number of dedicated pilots in a given block.

Described herein are examples of systems, methods, and other embodiments associated with channel processing with dedicated pilots using information from broadcast pilot signal (hereinafter broadcast pilot). The systems, methods, and other embodiments described herein leverage information from both the broadcast pilots and dedicated pilots in a resource block when performing channel processing. Channel processing is performed by deducing information about the channel from the broadcast pilots and then applying the information to the dedicated pilots to process the channel. In this manner, the accuracy with which the channel is processed is improved.

Figure 1:
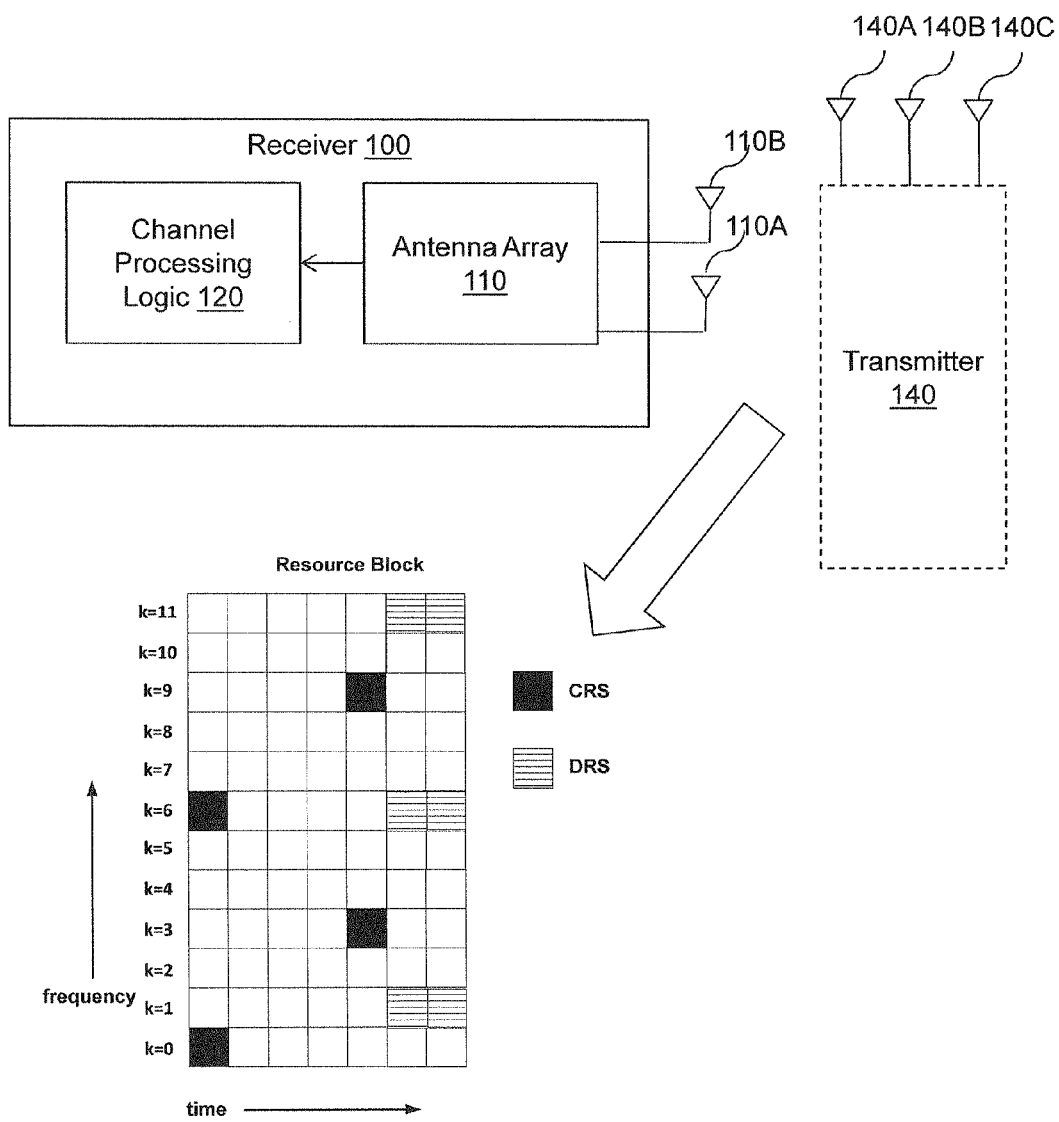
FIG. 1 illustrates one embodiment of an apparatus associated with channel processing with dedicated pilots using information from broadcast pilots.

FIG. 1 illustrates one embodiment of a receiver 100 that is configured to perform channel processing with dedicated pilot signal components using information from broadcast pilot signal components that may be transmitted in wideband. For the purposes of this disclosure, in certain examples channel estimation is performed using the systems and methods described herein. However, the systems and methods described herein can be applied to any type of channel processing such as synchronization, time and frequency tracking, signal detection, and so on.

The receiver includes an antenna array 110 that includes a plurality of antennas 110A, 110B. The antenna array 110 is configured to receive signals from a transmitter 140 that also includes multiple antennas 140A-140C. The transmitter 140 transmits Orthogonal Frequency Division Multiplexing (OFDM) signals to the receiver 100. To produce the OFDM signal, the transmitter precodes data signals and dedicated pilot signals to correspond to a spatial layer using a precoding scheme that is specifically allocated to the intended receiver. To precode the signals, the transmitter maps the spatial layer onto transmit antenna ports that correspond to combinations of the transmit antennas 140A-140C. The OFDM signal transmitted by the transmitter 140 may be modeled as a weighted sum of the signals stemming from the transmit antennas.

A schematic resource block can be seen in FIG. 1. Each resource block is allocated for a specific receiver. A resource block is a signal that includes a range of frequencies divided into several subcarriers and a predetermined number of time intervals. A symbol is a collection of data encoded in the range of frequency subcarriers (called tones) that occur in the same time interval. For example, the resource block with 12 tones and 7 symbols in FIG. 1 is one type of resource block used in Third Generation Partnership Project (3GPP) LTE/LTE-Advanced in a specific configuration.

The resource block includes the dedicated pilot signals (hereinafter dedicated pilots) that are used by the receiver 100 for channel estimation. The dedicated pilots are precoded using the same scheme as the data signals and may be embedded in the data signals. The resource block also includes broadcast pilot signals (hereinafter broadcast pilots) that are not precoded, or possibly precoded using a different scheme. Broadcast pilots are often broadcast in wideband and are intended for use by all receivers (not just the receiver allocated to a specific resource block and/or the spatial stream corresponding to the precoding scheme) for multiple purposes (e.g., frequency and timing tracking, synchronization, channel estimation).

For example, in 3GPP LTE/LTE-Advanced systems, broadcast pilots are broadcast and dedicated pilots are dedicated (e.g., UE-specific) for Physical Downlink Shared Channel (PDSCH) demodulation when UE-specific antenna ports are configured. The signal on a subcarrier in a typical resource block y, as received by a receiver, can be modeled as having the following three components:

$$y_{b\text{-}pilots} = H \cdot x_{b\text{-}pilots} + z$$

$$y_{d\text{-}pilots} = H \cdot P \cdot x_{d\text{-}pilots} + z$$

$$y_{data} = H \cdot P \cdot x_{data} + z$$

Herein for the purposes of notation simplicity, the indices for subcarrier and symbol are omitted, H is the "raw" (e.g., non-precoded) channel, H·P is the precoded channel, b-pilots are broadcast pilots (CRSS), d-pilots are dedicated pilots (DRSs), and z is noise. The broadcast pilots are transmitted over the raw channel H while the dedicated pilots are transmitted over the precoded channel H·P in which the data is transmitted.

The receiver 100 includes a channel processing logic 120 that is configured to deduce a channel property from at least one broadcast pilot (e.g., a broadcast pilot in the resource block or a broadcast pilot transmitted on wideband in all resource blocks) and then perform channel processing by applying the channel property to the dedicated pilots. As noted above, typically a receiver would use only the dedicated pilots for channel processing because the dedicated pilots are precoded using the same scheme as the data signals, and thus would be received in the same effective channel as the data signals. However, in certain cases, such as closed loop MIMO in Long Term Evolution (LTE) based systems, the transmit antennas from which the broadcast pilots are broadcast can be assumed to be "quasi co-located" with the transmit antennas from which the dedicated pilots are transmitted. This assumption means that the channels through which the dedicated pilots and broadcast pilots travel can be treated as correlated and the broadcast pilots may be used by the channel processing logic 120 for channel processing.

Broadcast pilots may be used to deduce many different channel properties, many of which are "large-scale" channel properties or "whole channel" property statistics. These types of channel properties are properties that do not vary significantly with time, frequency, and antenna. Example large scale channel properties that can be estimated using broadcast pilot signals include delay spread, received power level, frequency shift, Doppler spread, received timing, Doppler spectrum, noise variance, received SNR, channel correlation in time or frequency, and a power delay profile. In one embodiment, the channel estimation logic 120 is configured to determine a filter based, at least in part, on the channel property that is deduced from the broadcast pilots and to apply the filter to the dedicated pilots to estimate the effective channel.

Figure 2:
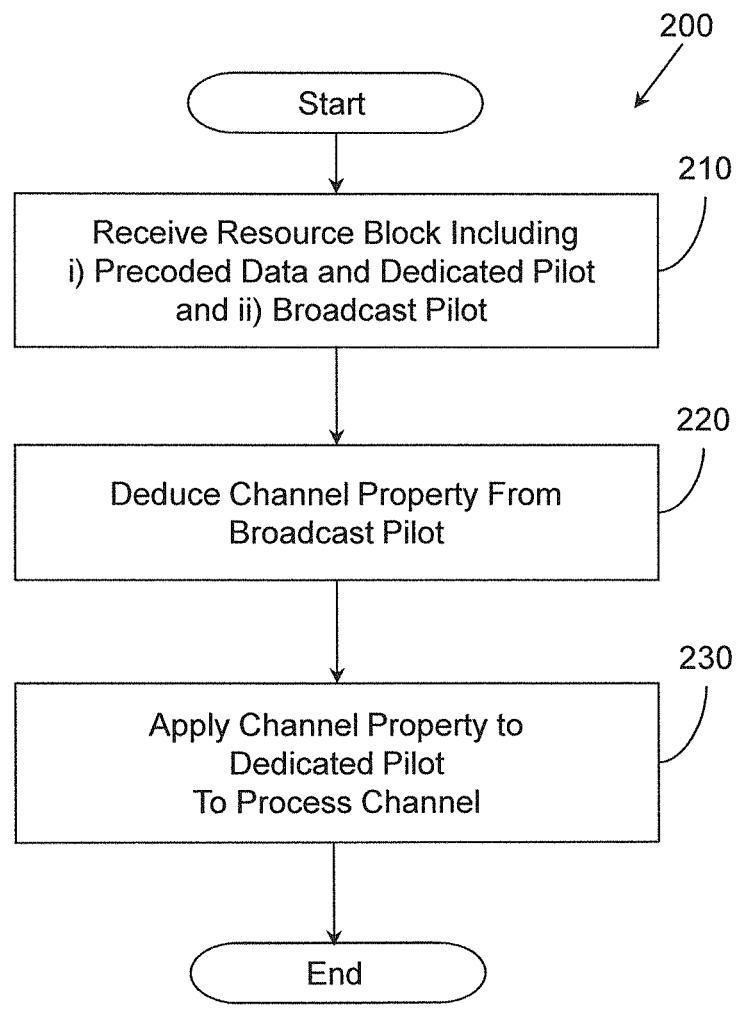
FIG. 2 illustrates one embodiment of a method associated with channel processing with dedicated pilots using information from broadcast pilots.

FIG. 2 illustrates one embodiment of a method 200 that performs channel estimation with dedicated pilots using information from broadcast pilots. The broadcast pilots may be included in all resource blocks transmitted in wideband. The method includes, at 210, receiving, through a channel, i) a signal resource block that includes a dedicated pilot that is precoded and ii) at least one broadcast pilot that is not precoded. At 220, a channel property is deduced from the broadcast pilot. The method includes, at 230, processing the channel by applying the channel property to the dedicated pilot.

In one embodiment, a filter is determined based on the channel property at 220, and at 230 the filter is applied to the dedicated pilot to process the channel. Note that as long as the transmit antennas from which the broadcast pilots are broadcast can be assumed to be "quasi co-located" with the transmit antennas from which the dedicated pilots are transmitted, for any given resource block transmitted from the transmit antennas, a channel property that is deduced from the broadcast pilot can be used to process the channel on subcarriers by filtering the dedicated pilot(s) in the resource block.

Figure 3:
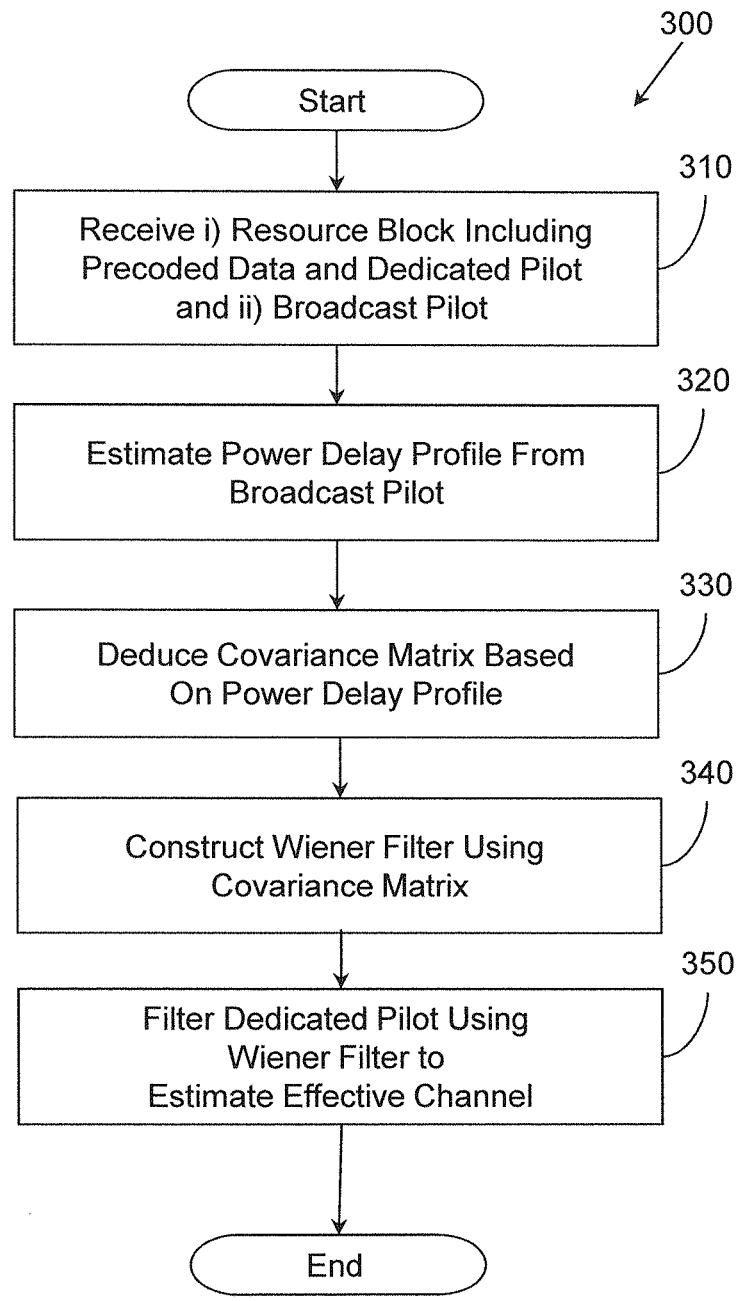
FIG. 3 illustrates one embodiment of a method associated with channel estimation with dedicated pilots using information from broadcast pilots

FIG. 3 illustrates one embodiment of a method 300 that performs channel estimation with dedicated pilots using information from broadcast pilots that are not precoded for a specific receiver. The broadcast pilots may be in all resource blocks in wideband. The method 300 is adapted for used in channel estimation for closed-loop MIMO in Third Generation Partnership Project (3GPP) LTE Release 9 or beyond. The method includes, at 310, receiving i) a resource block that includes data and dedicated pilots precoded for a specific receiver and ii) at least one broadcast pilot. In 3GPP Release 9, for a particular resource block, the channels on dedicated pilots may be modeled as linear combinations of the channels on broadcast pilots. The channel for the dedicated pilot in time in a specific resource block can be expressed as:

$$h(f) = \sum_{k=1}^{N_t} v_k(f) h_k$$

$N_t$ is the number of transmit antennas, v is the precoding coefficient, and h is the channel impulse response for the broadcast pilot. The channel for the dedicated pilot in frequency can be expressed as:

$$H(f) = F(f) \sum_{k=1}^{N_t} v_k(f) h_k$$

F(f) is the f-th row of a Fast Fourier Transform (FFT) matrix.

Wiener filter-based channel estimation is a computationally efficient way to perform channel estimation. The covariance matrix of the channel in frequency, C, which depends on large scale properties of the channel in time, can be used to determine coefficients for the Wiener filter that can be applied to the dedicated pilots to estimate the precoded/effective channel. The covariance matrix C depends on the power delay profile $E[hh^H]$ into the time domain:

$$C = E[HH^H] = F \cdot E[hh^H] \cdot F^H$$

Where $A^H$ denotes the Hermitian transpose of A.

The power delay profile reflects/indicates the frequency selective behavior of the channel and describes the profile (e.g., power and time delay) of resolved propagation paths arriving at the receiver at different delays. Usually, the power delay profile is made up of of the power of different propagation paths with different time delays that are the results of different clusters of objects in the channel, scattering the signal.

It would be difficult to estimate the power delay profile of the channel based solely on dedicated pilots in the resource block because of the limited number of dedicated pilots in the resource block. Thus, at 320 the method 300 uses the broadcast pilots, possibly in all resource blocks, to estimate the power delay profile. To estimate the power delay profile, the estimated "raw" channels on broadcast pilots from one or more antenna ports are transformed into the time domain to derive the power delay profile $E[hh^H]$. With the power delay profile thus derived, the covariance matrix can be calculated at 330.

At 340, the method includes constructing a Wiener filter using the covariance matrix. For example, based on the resource block shown in FIG. 1, the Wiener filter coefficients for estimating the channel on the k-th subcarrier in the symbols with dedicated pilots (index symbols are omitted) are:

$$\alpha_k = R^{-1} p_k$$

Where:

$$R = \begin{bmatrix} C(0)+\sigma^2 & C(5) & C(10) \\ C(-5) & C(0)+\sigma^2 & C(5) \\ C(-10) & C(-5) & C(0)+\sigma^2 \end{bmatrix}$$

and $$p^k = \begin{bmatrix} C(k-1) \\ C(k-6) \\ C(k-11) \end{bmatrix}$$

Where C(k) denotes the (k+1)th element of the first row of C, and C(k)=C(−k)*, and $\sigma^2$ denotes the noise varience.

At 350, the method includes estimating the effective channel on each subcarrier by filtering the dedicated pilots in the resource block using the Wiener filter. For OFDM symbols that include dedicated pilots, the Wiener filter can be applied to estimate the precoded channel in frequency. The estimated channel Ĥ(k) for the subcarrier k is:

$$\hat{H}(k) = \alpha_k^H \hat{H} = \alpha_k(1)^* \hat{H}(1) + \alpha_k(2)^* \hat{H}(6) + \alpha_k(3)^* \hat{H}(11)$$

Where Ĥ(1), Ĥ(6), and Ĥ(11), denote the estimation of the effective channel directly based on the dedicated pilots on subcarrier 1, 6, and 11, respectively.

Figure 4:
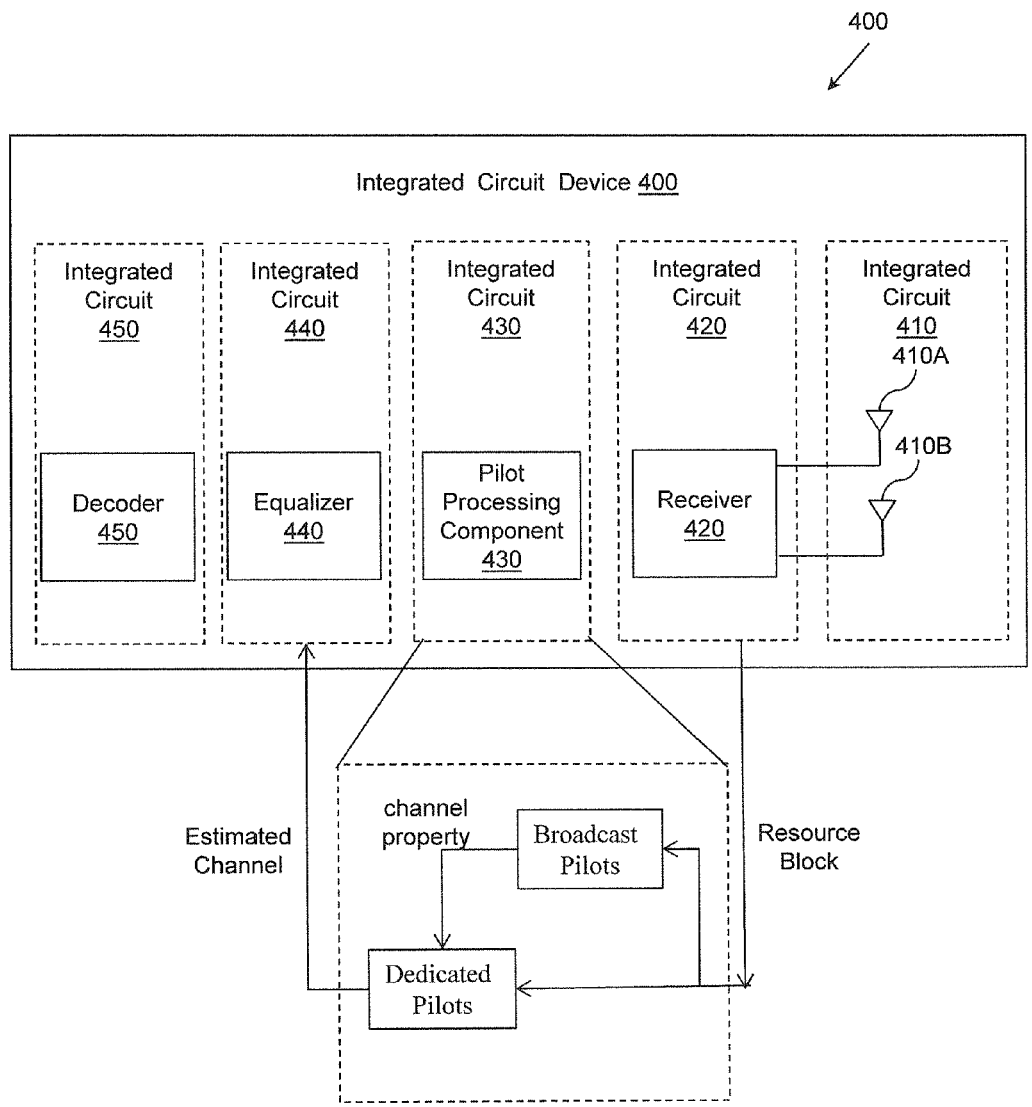
FIG. 4 illustrates one embodiment of a circuit configured to perform with channel estimation with dedicated pilots using information from broadcast pilots

FIG. 4 illustrates one embodiment of an integrated circuit device 400 that includes several integrated circuits. The device 400 includes a first integrated circuit 410 with a plurality of antennas 410A, 410B configured to receive precoded resource blocks and broadcast pilots in all resource blocks. Each resource block is intended for a receiver includes a dedicated pilot and data that is precoded for reception by a receiver 420. All resource blocks include a broadcast pilot that is not precoded. A second integrated circuit includes the receiver 410 that is configured to receive the resource block from the antennas 410A, 410B.

A third integrated circuit includes a pilot processing component 430 configured to estimate an effective channel for the resource block by deducing a channel property based, at least in part, on the broadcast pilot and estimating the effective channel based, at least in part, on the channel property and the dedicated pilot. The device 400 includes a fourth integrated circuit that provides an equalizer 440 configured to process the resource block to remove effects of the effective channel from the resource block and a fifth integrated circuit 450 that includes a decoder configured to decode the signal.

In one embodiment, the pilot processing component 430 is configured to perform the method 200 of FIG. 2. In another embodiment, the pilot processing component 430 is configured to perform the method 300 of FIG. 3. The pilot processing component 430 is configured to transform the broadcast pilot into the time domain to estimate a power delay profile for the channel. The pilot processing component 430 then deduces a covariance matrix of the channel in the frequency domain using the power delay profile. The pilot processing component 430 is configured to construct a Wiener filter with coefficients corresponding to the covariance matrix; and filter the dedicated pilot with the Wiener filter to estimate the effective channel.

As can be seen from the foregoing description, the systems, methods, and other embodiments described herein leverage information from both the broadcast pilots present in all resource blocks and dedicated pilots in a receiver-specific resource block when performing channel processing. Based on an assumption that the raw channel and precoded channel are correlated, channel processing, such as channel estimation, is performed by deducing information about the channel from the broadcast pilots and then applying the information to the dedicated pilots to estimate the precoded channel. In this manner, the accuracy with which the precoded channel is estimated is improved, while using pilots from within a single resource block.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    a receiver configured to receive, through a channel, a signal resource block that includes i) data, ii) a dedicated pilot that is precoded, in accordance with a same precoding scheme as the data, for reception by the receiver, and iii) at least one broadcast pilot that is not precoded in accordance with a same precoding scheme as the data for reception by the receiver; and
    a logic configured to determine an estimate of the channel through which the signal resource was received by
        (i) transforming the broadcast pilot into the time domain to estimate a power delay profile for the channel,
        (ii) deducing a covariance matrix of the channel in the frequency domain using the power delay profile;
        (iii) constructing a Wiener filter with coefficients corresponding to the covariance matrix; and
        (iv) filtering the dedicated pilot with the Wiener filter to determine the estimate of the channel through which the signal resource block was received.

2. A method, comprising:
    receiving, through a channel, a signal resource block that includes i) data ii) a dedicated pilot that is precoded, in accordance with the same precoding scheme as the data, and iii) at least one broadcast pilot that is not precoded in accordance with the same precoding scheme as the data;
    transforming the broadcast pilot into the time domain to estimate a power delay profile for the channel;
    deducing a covariance matrix of the channel using the power delay profile;
    constructing a Wiener filter with coefficients corresponding to the covariance matrix, and
    filtering the dedicated pilot in the signal resource block with the Wiener filter to determine an estimate of the channel through which the signal resource block was received.

3. An integrated circuit device comprising:
    a receiver;
    a plurality of antennas configured to receive a signal resource block that includes i) data, ii) a dedicated pilot that is precoded, in accordance with a same precoding scheme as the data, for reception by the receiver and iii) at least one broadcast pilot that is not precoded in accordance with a same precoding scheme as the data; and
    a pilot processing component configured to determine an estimate of the channel through which the signal resource block was received by
        (i) transforming the broadcast pilot into the time domain to estimate a power delay profile for the channel,
        (ii) deducing a covariance matrix of the channel in the frequency domain using the power delay profile;
        (iii) constructing a Wiener filter with coefficients corresponding to the covariance matrix; and
        (iv) filtering the dedicated pilot with the Wiener filter to determine the estimate of the channel through which the signal resource block was received.

4. The integrated circuit device of claim 3, wherein the signal resource block includes a plurality of broadcast pilots and a plurality of dedicated pilots, and wherein within a given signal resource block, broadcast pilots are non-overlapping with respect to the dedicated pilots in time and frequency.

5. The integrated circuit device of claim 3, wherein the plurality of antennas are located within close physical proximity to one another, further wherein the pilot processing component treats the plurality of antennas as being quasi co-located.

6. The integrated circuit device of claim 3, wherein the broadcast pilot is included in a reference signal that is transmitted in wideband.

7. The apparatus of claim 1, wherein the signal resource block includes a plurality of broadcast pilots and a plurality of dedicated pilots, and wherein within a given signal resource block, broadcast pilots are non-overlapping with respect to the dedicated pilots in time and frequency.

8. The apparatus of claim 1, wherein the broadcast pilot is included in a reference signal that is transmitted in wideband.

9. The apparatus of claim 1, wherein the logic is configured to estimate the power delay profile based on the at least on broadcast pilot in the signal resource block without considering broadcast pilots in other signal resource blocks.

10. The method of claim 2, wherein the signal resource block includes a plurality of broadcast pilots and a plurality of dedicated pilots, and wherein within a given signal resource block, broadcast pilots are non-overlapping with respect to the dedicated pilots in time and frequency.

11. The method of claim 2, wherein the broadcast pilot is included in a reference signal that is transmitted in wideband.

12. The method of claim 2, wherein the estimating comprises estimating the power delay profile based on the at least on broadcast pilot in the signal resource block without considering broadcast pilots in other signal resource blocks.

13. The integrated circuit of claim 3, wherein the pilot processing component is configured to estimate the power delay profile based on the at least on broadcast pilot in the signal resource block without considering broadcast pilots in other signal resource blocks.

* * * * *